United States Patent [19]

Sanvitale

[11] Patent Number: 4,479,421
[45] Date of Patent: Oct. 30, 1984

[54] COFFEE-BREW PERCOLATOR

[76] Inventor: Salvatore Sanvitale, Via Buccella, 6, Trento, Italy

[21] Appl. No.: 436,754

[22] Filed: Oct. 25, 1982

[30] Foreign Application Priority Data

Nov. 2, 1981 [IT] Italy .............................. 82230 A/81

[51] Int. Cl.³ .................... A47J 31/12; A47J 31/30
[52] U.S. Cl. ........................... 99/303; 99/293; 99/302 R; 426/433
[58] Field of Search ............. 99/293, 295, 300, 302 R, 99/303, 279; 426/433

[56] References Cited

U.S. PATENT DOCUMENTS

| 405,946 | 6/1889 | Bulow | 99/293 |
|---|---|---|---|
| 494,206 | 3/1893 | Jones | 99/295 |
| 539,165 | 6/1895 | Burrows | 99/293 |
| 544,963 | 8/1895 | Cummings | 99/293 |
| 3,413,910 | 12/1968 | Sanvitale | 99/303 |
| 3,472,152 | 10/1969 | Broadwin | 99/293 |
| 3,757,670 | 9/1973 | Laama et al. | 99/302 R |
| 4,167,899 | 9/1979 | McCormick | 99/302 R |

FOREIGN PATENT DOCUMENTS

| 1060328 | 11/1953 | France | 99/303 |
|---|---|---|---|
| 0423459 | 10/1974 | U.S.S.R. | 99/303 |

*Primary Examiner*—Philip R. Coe
*Assistant Examiner*—Michael Knick
*Attorney, Agent, or Firm*—Guido Modiano; Albert Josif

[57] ABSTRACT

The present invention relates to a coffee-brew percolator. The percolator comprises an outer vessel, a bottomless boiler slidably and removably arranged in the vessel, and one or more filters designed to confine in the vessel a space above the boiler for accommodating coffee powder. The boiler has one or more calibrated openings or holes through which steam or vapor can be discharged in use. The boiler is free to slightly move towards and away from the space containing coffee powder so that the latter is packed and amounts of water calibrated in accordance with the pressure level in the boiler are released from the bottom of the boiler towards the coffee powder in the space.

5 Claims, 11 Drawing Figures

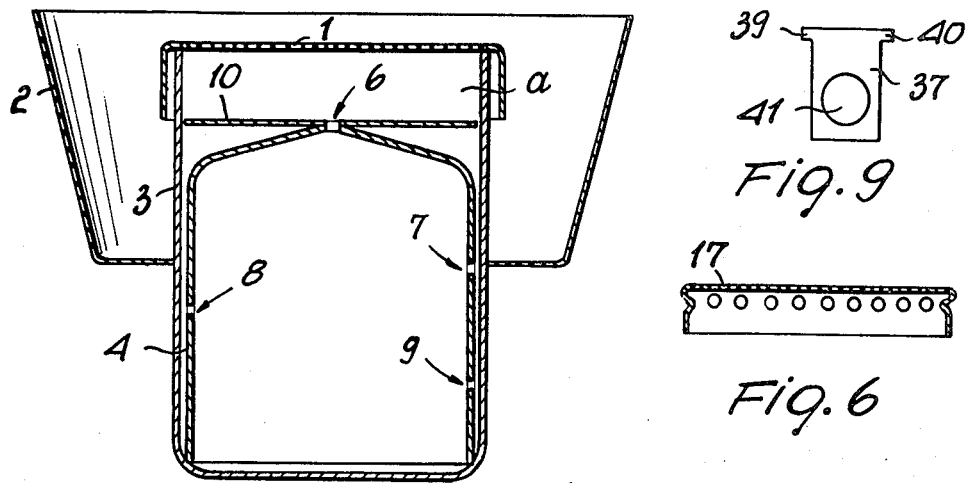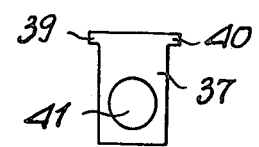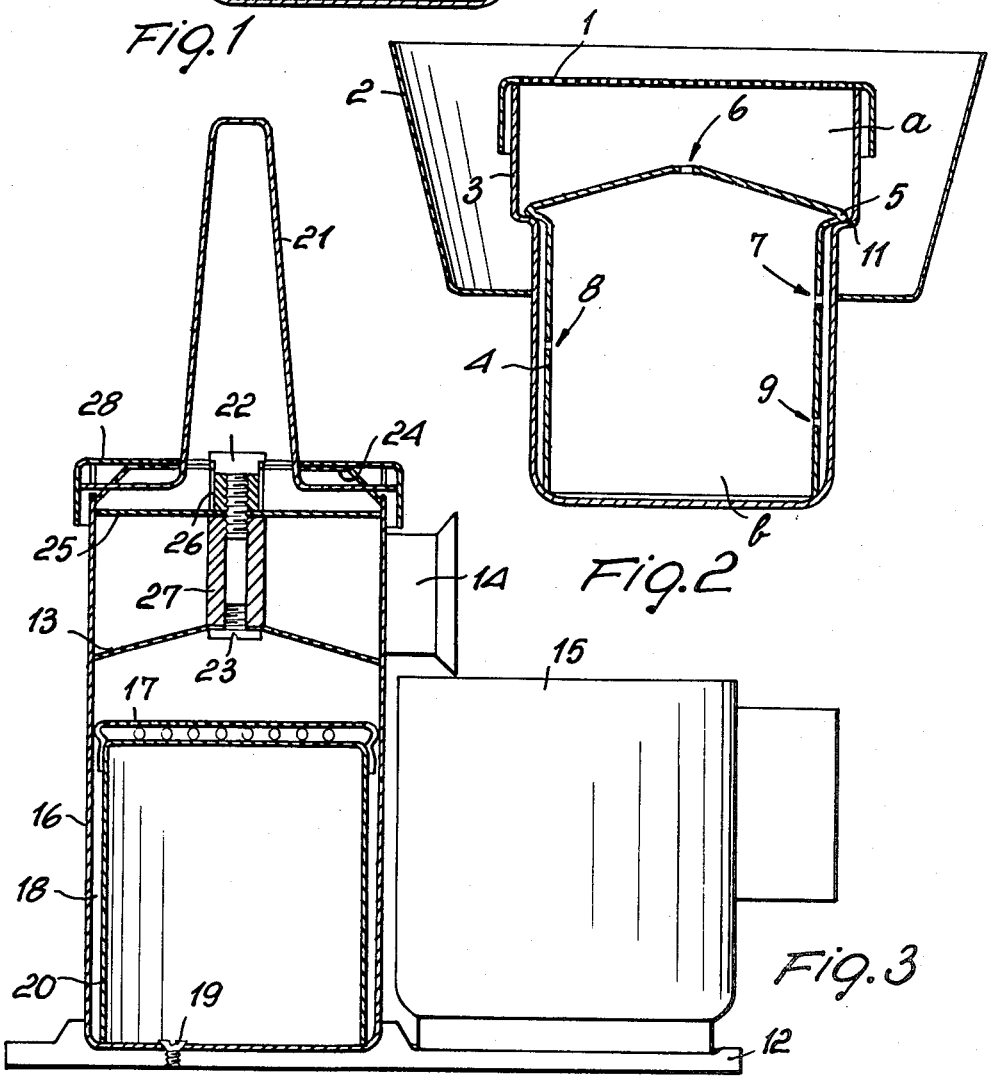

COFFEE-BREW PERCOLATOR

BACKGROUND OF THE INVENTION

This invention relates to a percolator for making a coffee brew.

The percolator is primarily intended for domestic use and can operate without sealing gasket and relief valve. The percolator enables in particular the preparation of "espresso" type coffee with cream and of white coffee when milk is boiled in the percolator instead of water.

Numerous types of coffee powder pressure percolator are known. All of them need a relief valve and at least one gasket of rubber or other suitable material. Most conventional percolators are both costly to manufacture and necessitate repeated replacements of their gasket.

An object of the present invention is to provide a pressure coffee powder percolator having no gasket and no relief valve.

It is another object of the present invention to provide a percolator which constitutes an important innovation and brings about substantial constructional improvements over pressure percolators currently available on the market.

According to the invention there is provided a coffee-brew percolator comprising a vessel, a bottomless boiler slidably arranged in it, a filter designed to confine in the vessel a space for accommodating coffee powder above the boiler, characterized in that the boiler has at least one calibrated opening through which steam or vapor can be discharged, and is free, in use, to move towards and away from the said space, thereby releasing pressure-calibrated amounts of water towards the said space and packing the coffee powder in the space.

BRIEF DESCRIPTION OF THE DRAWINGS

A few embodiments of the percolator in accordance with the present invention are described below with reference to the accompanying drawings, in which:

FIG. 1 is a cross-sectional view of a percolator having an outer annular collector;

FIG. 2 is a cross-sectional view of a modification of the percolator of FIG. 1;

FIG. 3 is a cross-sectional view of a collectorless percolator;

FIG. 6 shows in detail a boiler filter;

FIG. 9 shows a detail of FIG. 8;

DESCRIPTION OF THE PREFERRED EMBODIMENTS

Figures 4, 5, 7, 8, 10, 11:
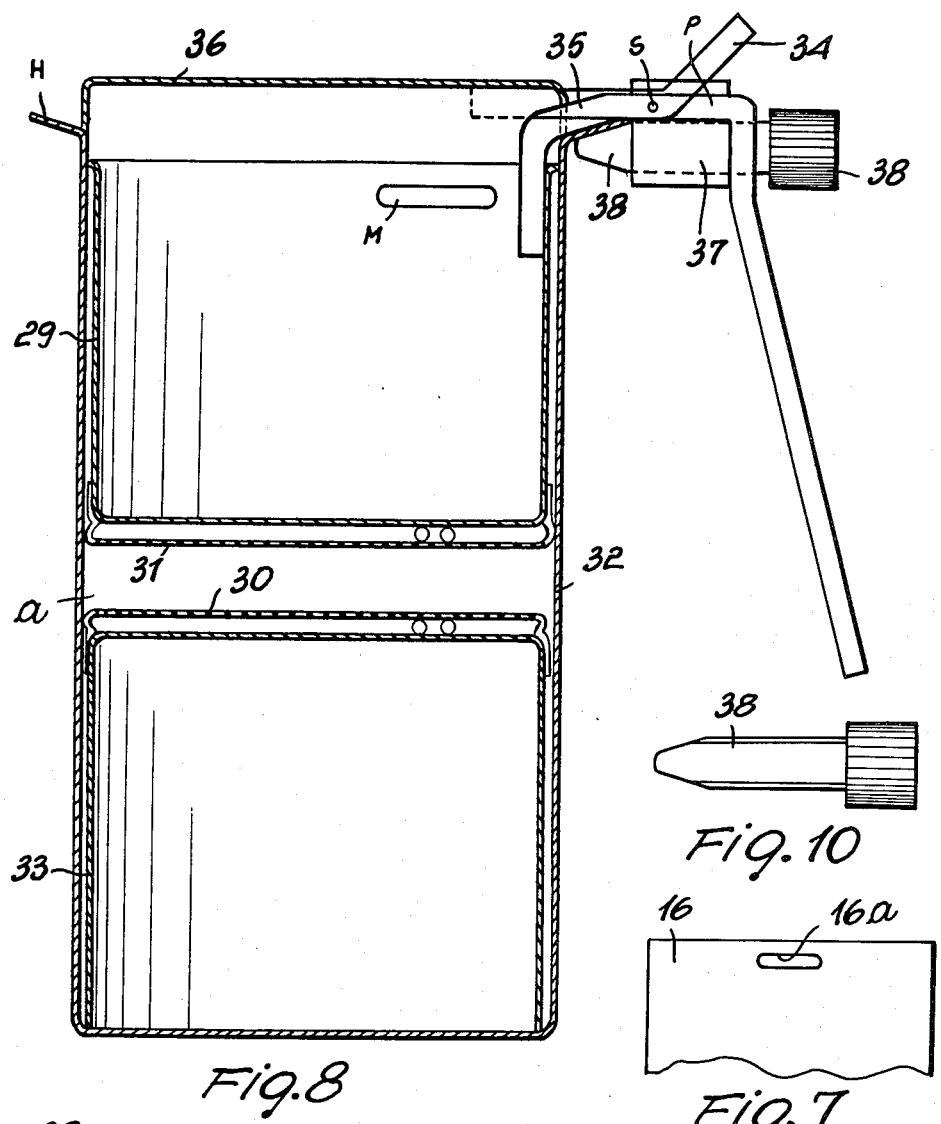
FIG. 4 is a top view of the lid of the percolator of FIG. 3.
FIG. 5 is a top view of a disk underneath the lid of FIG. 4.
FIG. 7 shows a detail of FIG. 8.
FIG. 8 is a cross-sectional view of a percolator having an inner collector located above the boiler.
FIG. 10 shows a hand screw.
FIG. 11 is a top view of a detail of FIG. 8.

With reference to FIG. 1, the percolator comprises a filter 1, an annular coffee-brew collector 2, a vessel 3, a boiler 4, a perforated water-spreading screen 10. Holes 6, 7, 8 and 9, e.g. having a diameter of about two millimeters, are formed in the walls of the boiler 4.

The percolator can be used as follows.

The vessel 3 is filled with water (or milk) up to a desired level. Thereafter, the boiler 4 is lowered in the vessel 3. Owing to the provision of the holes 7, 8, 9 and especially of the calibrated hole 6 in the top of the boiler 4, the boiler 4 will slide easily down within the vessel and reaches the vessel bottom, e.g. in two seconds. Advantageously the outer diameter of the boiler is about two millimeters smaller than the inner diameter of the vessel. Three small projections (not shown) spaced apart by 120° from one another, are designed to guide and to keep it centered in the vessel 3.

Next, powder coffee is poured into the empty space a provided above the screen 10 (which has a diameter just a few tenths of a millimeter smaller than the inside diameter of the vessel) and the top filter 1 is threaded on.

The percolator is then placed on a heat source, the water (or milk) inside it is heated and steam (vapor) is produced. If greater amounts of steam then can be exhausted through the hole 6 (which is covered by the coffee powder) are produced inside the boiler constantly, increasing pressure is created. Such a pressure is responsible for the following two sequential results. In the first place, it causes the boiler 4 to raise from the vessel bottom. This is advantageous for two reasons. An annular gap is formed between the lower edge of the vessel 3 and the boiler so that water can escape through it and flow upwards. The screen 10 which is rigid with the boiler 4 presses the coffee powder in the space a against the filter 1, thereby obtaining a more compact pack of coffee powder, which is thus easily fully exploitable and better stands the flow of steam from the hole 6. In the second place, increasing pressure causes water (or milk) to flow through the peripheral interspace, between the vessel 3 and the boiler 4 and to move upwards through the coffee powder and filter 1.

The space a designed to contain coffee powder has preferably a relatively large diameter-to-height ratio, since a relatively large coffee powder pack of just a few millimeter height is better exploited than a relatively thick and narrow one.

It will be appreciated that the water pressure in a percolator in accordance with the invention can be kept at a substantially lower level than in most traditional pressure percolators.

Moreover, the provision of the top hole 6 (which can also be considered to be a constantly open relief valve), will ensure pressure relief in all circumstances.

The side holes 7, 8 and 9, located all around the boiler 4 at different heights are designed to slow down the water outflow from the boiler as the water level decreases in it. Moreover, steam is exhausted through them, and this, when milk is used, aids in the formation of a creamy foam that many people like.

In the embodiment of FIG. 2, the water spreading screen 10 is omitted. The screen 10 is actually required mainly to prevent coffee powder from entering the interspace between the vessel 3 and the boiler 4.

In FIG. 2 this function is performed by a peripheral projection 5 formed around the top of boiler 4. In use, the projection 5 rests on a shoulder 11 in the side wall of the vessel.

FIG. 3 shows a percolator having no collector 2. In this embodiment, the percolator is preferably made of stainless steel and may be attached in a permanent way or not, to a die-cast aluminum base 12. The coffee-brew produced by the percolator is collected in a cup 15 or the like suitably arranged on the base 12 near the percolator.

The percolator comprises three main components easy to assemble and to disassemble for cleaning or inspection purposes.

The base 12 is joined to the vessel 16 by a screw 19.

A filter 13 is sustained by means which will be described later. A further filter 17 engages the bottomless boiler 20.

The filter 17 is illustrated in more detail in FIG. 6 and can be readily placed on and removed from the boiler 20.

The cover 28 comprises a flat spring 21 a few millimeters wide which is shaped as an inverted "V", a guide disk 24 for the ends of the spring 21 bent at right angle, a spray deflector 25, as well as a spacer 26 located between the disk 24 and the deflector 25, screws 22 and 23, a threaded spacer 27 located between the deflector 25 and the filter 13 and in which the screws 22 and 23 are threaded.

The two legs of the spring 21 pass through a slot 28a formed in a cover 28 (FIG. 4) and a slot 24a formed in the disk 24 (FIG. 5). Two notches a and b formed in the disk 24 at diametrically opposed locations define a guide for the right-angle bent ends of the spring 21.

The above components are assembled in the following manner. The spring 21 is inserted into the guide disk 24 through the cover 28. The screw 22 is seated in the cover. The spacer 26 and spray deflector 25 are threaded one after the other on the screw 22. The threaded spacer 26 is screwed by means of the screw 23 to the spacer 27. Tightening of the screw results in the whole assembly being fastened together.

For accommodating said assembly onto the vessel 16, two diametrically opposed rectangular slots 16a (one of them is shown in FIG. 7) are formed in the vessel 16 and have slightly larger dimensions than those of the ends of the spring 21.

The whole assembly is placed on the vessel 16 by holding the spring 21 between one's fingers and pressing the opposed spring portions together so that the spring ends are brought close to one another when applying the cover 28 on the vessel 16, and by releasing the spring 21 thereby leaving its ends free to engage the slots 16a. Should the spring ends not be aligned with their respective slots 16a, it will be sufficient to rotate the cover to let them snap engage with the slots. The two legs of the spring, in being restored to their abutment position against the cover inner wall, but through the two slots in the vessel, will prevent the cover from releasing itself from the vessel.

FIG. 6 shows some through holes which occupy both the top and partly the cylindrical side wall of the filter 17. Water from the boiler 20 can readily reach the small holes in the filter 17 by flowing upwards through the interspace 18.

The operation of the percolator shown in FIG. 3 is similar to that of the percolators of FIGS. 1 and 2 except that, as the coffee infusion leaves the filter 13, it flows through the spout 14 and is collected in the cup 15. Since no gasket is provided to generate suitable pressure in the boiler, the difference between the inner diameter of the vessel 16 and the diameters of the filter 13 and the further filter 12 must be small, e.g. a few tenths of a millimeter, just sufficient to permit loose fit of the filters in the vessel and to prevent the coffee powder from being displaced either to the interspace 18 or above the filter 13 (i.e. into the beverage). Thus, it is possible to use a lid or cover 28 for the vessel 16 which is not only effective and attractive but also simple to manufacture and suitable for mass production.

FIG. 8 illustrates a percolator having an inner upper collector 29 located above its boiler 33. Two filters 30 and 31 identical to each other and of the type described with reference to FIG. 6 are provided.

The percolator of FIG. 8 comprises the following main components: the boiler 33; a slide-off filter 30 placed on top of it; a cylindrical vessel 32 having an uniformed flared rim H; the collector 29 having one or more openings M and the slide-off lower filter 31; a handle 35, and a lid or cover 36. The handle 35 is rigid with the collector (as shown in the drawings) and includes a shaped section (e.g. of stainless steel) having a thickness of, say 4-5 millimeters and a width of 20 to 30 millimeters.

The configuration of the handle 35 is such as to have an end length arranged inside the collector, an intermediate length at 90° to the vessel wall, and finally a grasp end length extending at a suitable inclination with respect to the intermediate section.

The lid 36 is hinged to the intermediate horizontal section P (FIGS. 8 and 11) by means of two small bars 34 pivoted at S and arranged one on either side of the handle. A rectangular aperture is formed in the section P of the handle and accommodates a block 37 (FIG. 9), e.g. made of stainless steel and having two flanges 39 and 40 and a threaded hole 41. The threaded hole 41 is aligned with a non-threaded hole 42 of the grasp end length of the handle 35 and a lockscrew 38 (FIG. 10) can pass through the hole 42 to be threaded into the hole 41 in the block 37.

The handle 35 is secured to the percolator as follows. Once the collector 29 has been placed into the vessel 32, the end portion of the handle 35 is applied (at desired point of the periphery) on the flared rim H. In such a position the screw 38 is threaded in position until its end contacts the rim H. Dissassembly of the handle is effected by unscrewing the screw 38. FIG. 11 shows a top partial view of the handle 35 horizontal section.

The operation of the percolator shown in FIG. 8 is as follows. Upon heating, water flows upwards through the interspace between the boiler 33 and vessel 32 and through the holes in the filter 30, reaches the coffee powder located in the space between the filters 30 and 31, and passes through the powder pack (while the filter 30 performs its pressing action). The coffee-brew flows then through the holes or perforations in the filter 31 and up through the gap between the collector 29 and vessel 32 and is collected in the collector 29. Since the collector terminates with a rim having a diameter which is only a few tenths of a millimeter smaller than the inner diameter of the vessel 32, two rectangular openings M are laterally formed in the collector wall. The said openings M are located a few millimeters below the collector rim and are dimensioned in accordance with the size or capacity of the percolator. The openings M are preferably two in number and located on either side of the end portion of the handle 35 as it is advantageous that as coffee infusion or brew is being poured out liquid cannot flow back into the gap between vessel and collector.

It will be noted that this embodiment of the percolator has a number of considerable constructional advantages. Moreover, it can be simply and very efficiently closed quickly and thoroughly cleaned and washed. The two (identical) filters 30 and 31 can be easily inspected. All the components and parts can be made of stainless steel.

I claim:

1. A coffee-brew percolator comprising a vessel, a bottomless boiler arranged within the vessel slidably with respect thereto and having cross dimensions with respect to said vessel such as to define a gap between said bottomless boiler and said vessel, a filter arranged above said bottomless boiler and delimiting a space for receiving coffee powder between said bottomless boiler and said filter, and comprising a further filter engaging the top of said bottomless boiler and having a cross dimension slightly smaller than the cross dimension of said vessel, whereby said further filter is movable together with said bottomless boiler under the action of pressure water.

2. A percolator as claimed in claim 1, wherein said bottomless boiler has at least one calibrated through hole in a top face thereof.

3. A percolator as claimed in claim 1, further comprising an upper collector within said vessel above said bottomless boiler, said upper collector having substantially the same structure as said bottomless boiler and having a lower filter engaged therewith, said upper collector and said lower filter each having a cross dimension slightly smaller than the cross dimension of said vessel to define a gap with said vessel.

4. A percolator as claimed in claim 3, wherein said lower filter has a cylindrical side wall having through holes therein.

5. A percolator as claimed in claim 1, wherein said further filter has a cylindrical side wall having through holes therein.

* * * * *